Patented Dec. 2, 1930

1,783,662

UNITED STATES PATENT OFFICE

KARL MARX, HERMANN BEHNCKE, AND KARL BRODERSEN, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

HIGHLY-ACTIVE CATALYST

No Drawing. Application filed November 29, 1927, Serial No. 236,582, and in Germany December 14, 1926.

In our co-pending application Ser. No. 201,557, we describe and claim generally catalysts of non-noble metals in a finely subdivided form and their manufacture wherein the catalytic metals are separated from solutions of their salts by means of a more electropositive metal; in special cases the catalysts are separated from solutions containing for instance ammonia, pyridine or urea.

Now we have found that extraordinarily active catalysts may also be obtained by causing the metal to separate from a solution of a salt thereof in an alkaline medium by means of hydrogen or by gases containing hydrogen. The solution applied may be alkaline by addition of ammonia, organic bases, acid amides and so on.

All organic bases or acid amides may be used which form with the metal salt in question complex compounds, being soluble in water, such as urea, pyridine, tri-ethanolamine, aniline, methylamine and homolog bases.

The following examples illustrate the invention without limiting it:—

*Example 1.*—103 parts of nickel sulphate are dissolved in 400 parts of water and the solution is mixed with 120 parts of pyridine. To this mixture are added 110 parts of kieselguhr and 2 parts of finely subdivided nickel. The metal is then precipitated upon a carrier by treating the mixture in an autoclave provided with a stirrer by introduction of hydrogen at 30–40 atmospheres pressure at about 100° C. The catalyst is separated from the liquid and washed. It may be used in moist condition or after it has been dried for catalytic reductions or hydrogenations.

*Example 2.*—119 parts of nickelous chloride are dissolved in 600 parts of water and the solution is mixed with 250 parts of a concentrated solution of ammonia and 15 parts of ammonium chloride. To this mixture are added 150 parts of kieselguhr and 2 parts of finely subdivided nickel. The metal is then precipitated upon a carrier by treating the mixture in an autoclave provided with a stirrer by introduction of hydrogen at 30–35 atmospheres pressure at about 100° C. The catalyst is separated from the solution; it may be used in moist condition or in dried state for catalytic reductions or hydrogenations. It is obvious to those skilled in the art that our present invention is not limited to the details given in the examples. For instance other nickel salts may be applied. In the same manner cobalt or copper may be separated from solutions of their salts in a very finely subdivided and extremely active form. Mixed catalysts are obtained from a solution containing several metal salts.

What we claim is:—

1. The process for manufacturing a catalytically acting metal which comprises acting with a gas containing hydrogen under a pressure of at least 20 atmospheres upon a solution of a salt of the said metal in the presence of a base of the group consisting of ammonia, organic bases and acid amides.

2. The process for manufacturing a catalytically acting metal which comprises acting with hydrogen under a pressure of at least 20 atmospheres upon a solution of a salt of the said metal in the presence of a carrier and of a base of the group consisting of ammonia, organic bases and acid amides.

3. The process for manufacturing a catalytically acting metal which comprises acting with hydrogen under a pressure of at least 20 atmospheres upon a solution of a salt of the said metal in the presence of a carrier, a finely subdivided catalytic metal and a base of the group consisting of ammonia, organic bases and acid amides.

4. The process for manufacturing a nickel catalyst which comprises acting with hydrogen under a pressure of 20 atmospheres upon a solution of a nickel salt in the presence of a base of the group consisting of ammonia, organic bases and acid amides.

In testimony whereof, we affix our signatures.

KARL MARX.
HERMANN BEHNCKE.
KARL BRODERSEN.